United States Patent Office 3,491,806
Patented Jan. 27, 1970

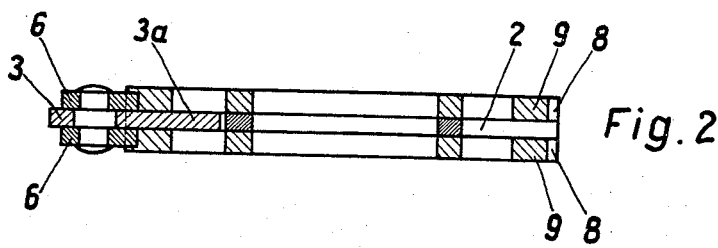
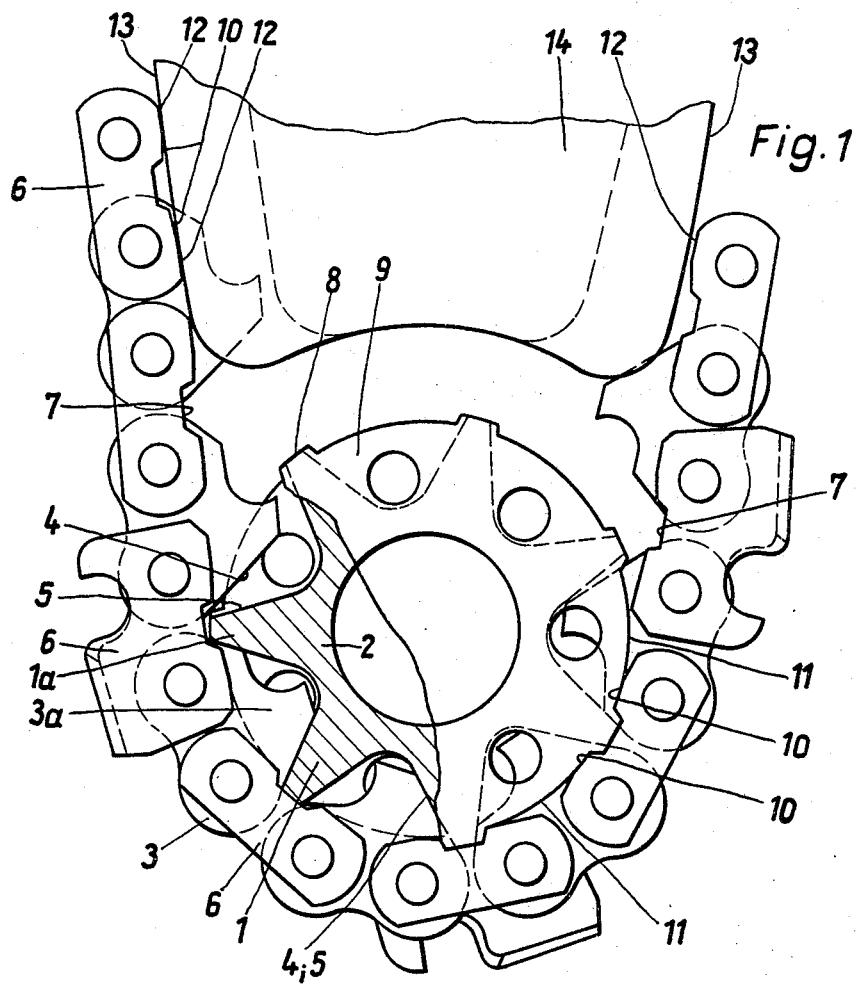

3,491,806
SPROCKET WHEEL, ESPECIALLY FOR
MOTOR CHAIN SAWS
Eugen Kaisser, Lorch, Hans Dolata, Neustadt, and Hans
Peter Stihl, Hochberg (Neckar), Germany, assignors to
Andreas Stihl Maschinenfabrik, Neustadt-Waiblingen,
Germany
Filed Nov. 23, 1966, Ser. No. 596,632
Claims priority, application Germany, Dec. 3, 1965,
St 24,723
Int. Cl. B27b 17/08
U.S. Cl. 143—32                                                    6 Claims

ABSTRACT OF THE DISCLOSURE

A chain drive for an endless saw chain having central link means and lateral link means laterally on opposite sides of the central link means collectively under continual radial guidance of a sprocket wheel having a central part between two lateral parts respectively interengaged with the central link means for movement essentially free from play other than only guide tolerance in a direction axially of the chain drive. The radial guidance is provided by circumferentially substantially uniformly spaced radial elevations on each of the two lateral parts of the sprocket wheel complementary radially to the lateral link means of the chain. The radial elevations in circumferential direction have longer arcuate span than arcuate span of extension tooth tips of the central part of the sprocket located intermediate to the lateral parts.

---

The present invention relates to a sprocket wheel for motor chain saws which comprises two lateral members and an intermediate member adapted to receive corresponding teeth on central links of a saw chain, the circumferential surface of said lateral members forming radial guiding means for corresponding lateral links of the saw chain.

With heretofore known chain driving sprocket wheels of this type, the teeth of the central links of the chain which engage the tooth spaces of the said intermediate member secure the axial position of the circulating chain. At the same time, the interengaging tooth flanks of the sprocket wheel and the saw chain are relieved from radial pressure because the lateral links of the chain engage the circumference of the lateral members of the chain driving sprocket. In this way a safe guiding of the chain at the reversing and driving sections will be assured.

The above mentioned chain saws, however, have the drawback that the wear at the inner surface of the lateral links, which also serve for supporting the chain when the latter moves over the guiding rails in the working and the slack section, react upon the guiding precision when passing over the chain driving sprocket wheel. In view of the relatively high circumferential speed, at the inner surface of the lateral links due to the contact with the guiding rails, the wear is so rapid and great that the radial support on the lateral members of the chain driving sprocket is no longer effective. The radial support then again takes place on the central links of the chain saw and causes excessive wear not only on the chain's teeth, but also brings about tilting movements with a non-uniform movement of the chain which may lead to a deformation of the central links of the chain and may cause the chain to break.

It is, therefore, an object of the present invention to provide a chain drive of the above mentioned general type, which will overcome the drawbacks outlined above.

It is another object of this invention to provide a chain drive of the above mentioned general type in which even at a relatively high degree of wear on the inner side of the lateral links, a safe radial support and guiding of the chain will be assured.

These and other objects and advantages of the invention will appear more clearly from the following specification in connection with the accompanying drawings, in which:

FIGURE 1 is a side view of a chain driving sprocket according to the invention, with a circulating chain and a portion of the adjacent guiding rails.

FIGURE 2 is a section along the line II—II of FIG. 1.

Figure 4:
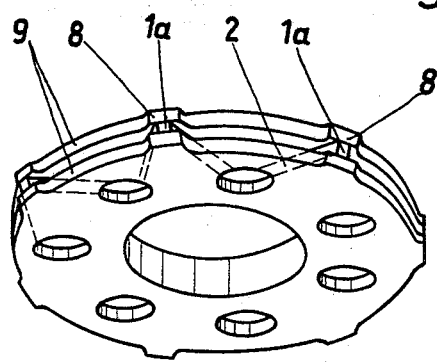
FIGURE 4 is a perspective view of a one-piece chain driving sprocket according to the invention.

A chain driving sprocket according to the present invention is characterized primarily in that the lateral members of the chain driving sprocket have their outer circumference provided with cam-like elevations which are spaced from each other in conformity with the pitch of the chain links, said cam-like elevations being operable to engage corresponding recesses of the lateral links of the saw chain. With a chain drive of this type the supporting sections between driving sprocket and chain have been removed from the wear range at the inner surfaces of the lateral links. The guiding areas of the chain during the circulation thereof over the driving sprocket on one hand, and during the circulation over the guiding rails on the other hand (the guiding areas with or without tangential relative movement), are thus separated from each other. The height of the cam-like elevations at the lateral members of the chain-driving sprocket and the corresponding depth of the recesses in the lateral links of the chain can, without difficulties, be so dimensioned that at the lateral links there will be available considerable quantities of wear material which is sufficient for the entire lifetime of the chain with regard to other wear areas.

It may be mentioned that with customary chain saws, it is known to provide recesses on the inner surface of the lateral links for engagement with the teeth of a driving sprocket. These driving sprockets, however, do not have lateral parts for radially supporting the chain, while the width of the teeth of the driving sprocket substantially extends over the entire width of the chain links. Thus, in this instance, the radial support of the chain is to a larger extent effected at the tooth flanks between the chain and the driving sprocket, whereby a guiding of the chain equivalent to that according to the present invention, against lateral displacement and tilting of the chain links cannot be obtained, nor the desired wear freedom of the tooth flanks can be realized.

According to an advantageous further development of the present invention, the cam-like elevations of the lateral members in circumferential direction are arranged symmetrically adjacent the teeth of the central teeth of the chain driving sprocket. This structure can advantageously be so designed that the cam-like elevations in circumferential direction are wider than the tooth tips of the central member in the chain driving sprocket. Such a design, particularly well save the tooth tips against wear and assures a smooth running of the chain.

Referring now to the drawings in detail, the chain driving sprocket illustrated in FIGS. 1 and 2, comprises two lateral parts or members 9, and a central or intermediate member or part 2. These members may be designed as disc-shaped punched pieces, axially arranged adjacent to each other. The central member 2 forms a sprockket wheel, while the spaces between the teeth 1 are engaged by correspondingly tooth-shaped extensions 3a of the central links 3 of a circulating saw chain. The cooperating flanks 4, 5 of the extensions 3a and teeth 1 effect the tangential power tranmission for the drive for the chain.

The outer circumference of the lateral members 9 is provided with cam-like elevations 8, which are spaced from each other in conformity with the pitch of the chain. In sections 11 between the elevations 8, the circumferential portion of the lateral members 9 is circular. The elevations 8 are located laterally adjacent the teeth 1 and extend in circumferential direction symmetrically thereto. In the circumferential direction, the elevations 8 are wider than the tooth tips 1a adjacent thereto.

In addition to the above mentioned central links 3, the saw chain also has lateral links 6 which in succeeding order are in pairs differently provided with outer cutting teeth while forming connecting links. The lateral members provided with cutting teeth are in customary manner arranged alternately at both sides of the chain. The inner surface of the lateral members which are of particular importance in connection with the present invention are uniformly designed and in conformity with FIG. 1, comprise sections 10 and 12 arranged symmetrically with regard to the center of the links while recesses 7 are provided between said sections 10 and 12. The outer sections 12 of the lateral members 6 are parallel to the longitudinal axis of the lateral members and slide in the working and return section of the chain over running surfaces 13 of a guiding rail 14.

The inner sections 10 of the lateral links 6 are slightly inclined toward the inside and therefore do not contact the running surfaces 13, or only when a considerable wear has occurred. When passing over the driving sprocket wheel, the sections 10 contact the circular portions 11 of the lateral members 9 and support the chain in radial direction.

Furthermore, the radial support of the chain is also effected by the cam-shaped elevations 8 which during the circulation of the chain over the driving sprocket engage the central recesses 7 of the lateral links 6. Thus, when after a considerable wear of the inner surfaces of the lateral links 6, no longer any sufficient supporting surface exists between the driving sprocket and the chain in the sections 10, the elevations 8 with the recesses 7 fully protected against wear will still safely support the chain in radial direction.

Figure 3:
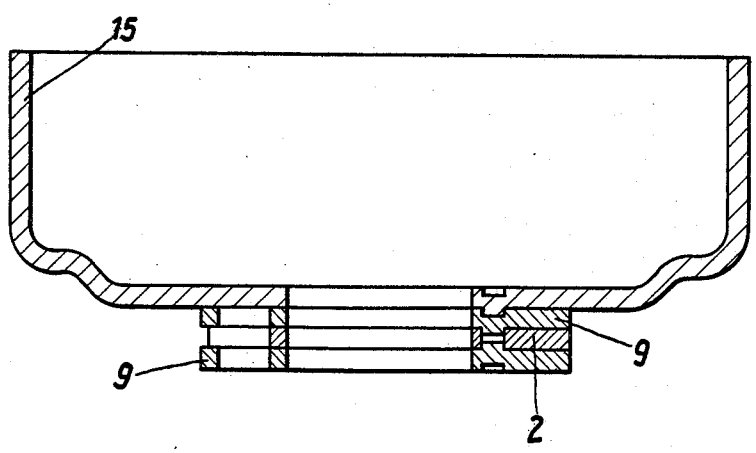
FIGURE 3 shows the mounting of a chain driving sprocket according to the invention on a clutch drum.

According to the embodiment of FIG. 3, the chain sprocket wheel is composed of a plurality of parts, namely, a central member 2 and two lateral members 9. Since, in view of the design according to the invention, even after a longer period of operation, tilting movements of the chain links are impossible, there exists the advantageous possibility of mounting the driving sprocket directly on a clutch drum 15 without any axial spacing.

According to the chain driving sprocket of FIG. 4, the lateral parts 9 and the central part 2 form a single piece with each other. The elevations 8, which in conformity with the present invention are provided at the circumference of the lateral parts 9 can, in this instance, be produced by means of corresponding pressing tools or casting molds in such a way that in circumferential direction they will be wider than the tooth tips 1a.

It is, of course too be understood that the present invention is, by no means, limited to the particular embodiments of the invention as set forth above, but also comprises any modifications that will appear to those skilled in the art.

What we claim is:

1. A chain drive for motor chain saws, which comprises: an endless saw chain having central link means and also having lateral link means respectively arranged on each of opposite sides of said central link means and provided with recess means at the inner circumferential portion of said central link means; and a sprocket wheel comprising a central part having its outer circumferential portion provided with teeth and tooth spaces for meshing engagement with said central link means, said sprocket wheel also comprising two lateral parts respectively arranged on each of opposite sides and adjacent to said central part and having their outer circumferential portions provided with circumferentially substantially uniformly spaced radial elevations in pairs for meshing engagement with said recess means and for continually aligned radial guidance of both of said lateral link means of said saw chain complementary radially with respect to both said lateral parts of said sprocket wheel and, simultaneously with interengagement of both said lateral link means with both said lateral parts respectively, movement of said central link means of said saw chain essentially is free from play other than only guide tolerance in a direction axially of said chain drive.

2. A chain drive according to claim 1, in which said radial elevations of said lateral parts are in circumferential direction thereof arranged coinciding symmetrically adjacent and laterally complementary to the teeth of said central part of said sprocket wheel.

3. A chain drive according to claim 1, in which said elevations in circumferential direction of said lateral parts are longer in arcuate span than arcuate span of the extension of the tooth tips located intermediate of said lateral parts in circumferential direction of said central part.

4. A chain drive according to claim 1, in which said central part and said lateral parts of said sprocket wheel form axially-aligned radial support in a unitary piece of which said central parts complements said central link means and concurrently said lateral parts both complement said lateral link means respectively.

5. A chain drive according to claim 1, in which the circumferential surfaces of said lateral parts follow the contour of a cylinder radially inwardly between said pairs of spaced elevations extending radially outwardly.

6. A chain drive according to claim 1, which includes a clutch drum having said sprocket wheel fixedly connected thereto axially and laterally to one side of one of said lateral parts.

References Cited

UNITED STATES PATENTS 3,099,924   8/1963   Armstrong _____ 143—32 X
3,358,523   12/1967  Ehlen _____ 143—32 X DONALD R. SCHRAN, Primary Examiner U.S. Cl. X.R.
74—229